US012722644B2

(12) United States Patent
Yamamoto et al.

(10) Patent No.: US 12,722,644 B2
(45) Date of Patent: Sep. 1, 2026

(54) INFORMATION PROCESSING DEVICE AND INFORMATION PROCESSING METHOD

(71) Applicant: TOYOTA JIDOSHA KABUSHIKI KAISHA, Toyota (JP)

(72) Inventors: Yasushi Yamamoto, Okazaki (JP); Yohsuke Hashimoto, Nagakute (JP); Satoshi Akima, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/954,804

(22) Filed: Nov. 21, 2024

(65) Prior Publication Data

US 2025/0187613 A1 Jun. 12, 2025

(30) Foreign Application Priority Data

Dec. 7, 2023 (JP) ................................ 2023-207068

(51) Int. Cl.
*B60W 40/09* (2012.01)
*B60K 35/28* (2024.01)
*B60W 50/14* (2020.01)

(52) U.S. Cl.
CPC ............. *B60W 40/09* (2013.01); *B60K 35/28* (2024.01); *B60W 50/14* (2013.01); *B60W 2540/30* (2013.01)

(58) Field of Classification Search
CPC .. B60W 40/09; B60W 50/14; B60W 2540/30; B60W 2556/10; B60K 35/28; G06F 16/9535
See application file for complete search history.

(56) References Cited

U.S. PATENT DOCUMENTS

| | | | | |
|---|---|---|---|---|
| 10,994,742 | B2 * | 5/2021 | Hayashi | G06V 40/172 |
| 11,648,937 | B2 * | 5/2023 | Ikezawa | B60W 30/18154 701/93 |
| 12,151,683 | B2 * | 11/2024 | Matsuura | B60W 10/04 |
| 12,515,689 | B2 * | 1/2026 | Toda | B60W 50/14 |
| 2011/0118929 | A1 * | 5/2011 | Takae | B60W 50/16 701/31.4 |
| 2015/0015383 | A1 * | 1/2015 | Sugano | B60W 30/095 340/435 |
| 2015/0186714 | A1 * | 7/2015 | Ren | B60W 40/09 348/77 |
| 2016/0272215 | A1 * | 9/2016 | Laine | G06V 20/597 |
| 2017/0101107 | A1 * | 4/2017 | Milch | B60W 40/09 |

(Continued)

FOREIGN PATENT DOCUMENTS

| | | |
|---|---|---|
| JP | 2015-184811 A | 10/2015 |
| JP | 2018-037002 A | 3/2018 |
| JP | 2022-138727 A | 9/2022 |

*Primary Examiner* — Curtis J King
(74) *Attorney, Agent, or Firm* — Oliff PLC

(57) ABSTRACT

An information processing device includes a processor configured to execute: acquiring information related to driving of a user of a vehicle during a predetermined period; extracting one or more predetermined behaviors according to the acquired information related to the driving; determining one or more first items to be recommended to the user according to degrees of deviation from standard states of the one or more predetermined behaviors corresponding to the respective extracted one or more predetermined behaviors; and transmitting information related to the first items to a terminal of the user.

17 Claims, 10 Drawing Sheets

(56) References Cited

U.S. PATENT DOCUMENTS

| | | | | |
|---|---|---|---|---|
| 2017/0329328 | A1* | 11/2017 | Horita | G08G 1/16 |
| 2020/0031365 | A1* | 1/2020 | Marti | B60K 35/25 |
| 2021/0162992 | A1* | 6/2021 | Ikezawa | B60W 30/18154 |
| 2021/0284234 | A1* | 9/2021 | Kokaki | B60W 50/14 |
| 2021/0323556 | A1* | 10/2021 | Matsumura | B60W 60/0015 |
| 2021/0379992 | A1* | 12/2021 | Domeyer | B60K 35/28 |
| 2022/0289204 | A1 | 9/2022 | Manabe | |
| 2023/0222813 | A1* | 7/2023 | Yorifuji | B60W 40/08 340/425.5 |
| 2023/0294721 | A1* | 9/2023 | Nakagawa | B60W 40/02 |
| 2023/0294723 | A1* | 9/2023 | Katayama | B60K 35/80 340/425.5 |
| 2024/0017735 | A1* | 1/2024 | Yamasaki | B60W 40/08 |
| 2024/0109552 | A1* | 4/2024 | Toda | B60W 40/105 |
| 2024/0140465 | A1* | 5/2024 | Oshita | B60W 50/14 |
| 2024/0182061 | A1* | 6/2024 | Wabeke | B60K 35/10 |
| 2024/0253653 | A1* | 8/2024 | Shimomura | B60W 50/14 |
| 2024/0253657 | A1* | 8/2024 | Sekine | B60K 35/654 |
| 2024/0262288 | A1* | 8/2024 | Sano | B60Q 9/00 |
| 2024/0399870 | A1* | 12/2024 | Kume | B60K 35/29 |
| 2025/0108795 | A1* | 4/2025 | Oniwa | B60W 30/0956 |
| 2025/0108800 | A1* | 4/2025 | Oniwa | B60W 10/18 |
| 2025/0115246 | A1* | 4/2025 | Aoyama | B60W 10/20 |
| 2025/0128725 | A1* | 4/2025 | Sato | B60W 40/08 |
| 2025/0145182 | A1* | 5/2025 | Fukumoto | B60W 60/00188 |
| 2026/0015007 | A1* | 1/2026 | Iwashita | B60W 50/14 |

* cited by examiner

VEHICLE INFORMATION DB 33

| VEHICLE ID | USER ID | TIME AND DATE | POSITION | SENSOR DETECTION VALUE |
|---|---|---|---|---|
| V001 | xxx | xxx | xxx | xxx |
| ... | ... | ... | ... | ... |

FIG. 5

DETECTION DATA 34

| | BEHAVIOR | TIME | POSITION | SCORE |
|---|---|---|---|---|
| 01 | SUDDEN BRAKING DURING LANE CHANGE | 8:35 | × × × | × × × |
| 02 | SUDDEN BRAKING DURING LANE CHANGE | 8:50 | × × × | × × × |
| 03 | SUDDEN BRAKING DURING LANE CHANGE | 9:03 | × × × | × × × |
| 01 | SUDDEN BRAKING DURING BACKING | 8:46 | × × × | × × × |
| 02 | SUDDEN BRAKING DURING BACKING | 9:13 | × × × | × × × |
| 01 | SUDDEN ACCELERATION | 8:56 | × × × | × × × |

FIG. 6

ITEM DATA 35

| BEHAVIOR | CONDITION | ITEM |
|---|---|---|
| SUDDEN ACCELERATION | ACCELERATOR OPERATION AMOUNT | PLUS SUPPORT KEY |
| SUDDEN BRAKING DURING BACKING | BRAKE G | PKSB |
| REVERSE STEERING DURING LANE CHANGE | REVERSE STEERING WHEEL ANGULAR SPEED | BSM |
| SUDDEN BRAKING DURING LANE CHANGE | BRAKE G | BSM |

FIG. 7

MESSAGE DATA 36

| BEHAVIOR | BEHAVIOR |
|---|---|
| SUDDEN ACCELERATION | xxx |
| SUDDEN BRAKING DURING BACKING | xxx |
| REVERSE STEERING DURING LANE CHANGE | xxx |
| SUDDEN BRAKING DURING LANE CHANGE | xxx |

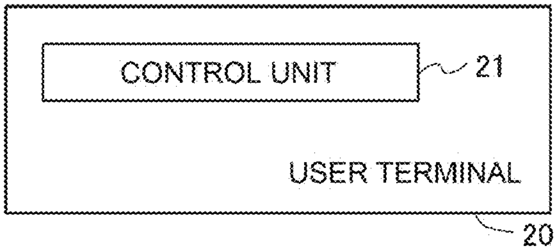

FIG. 10

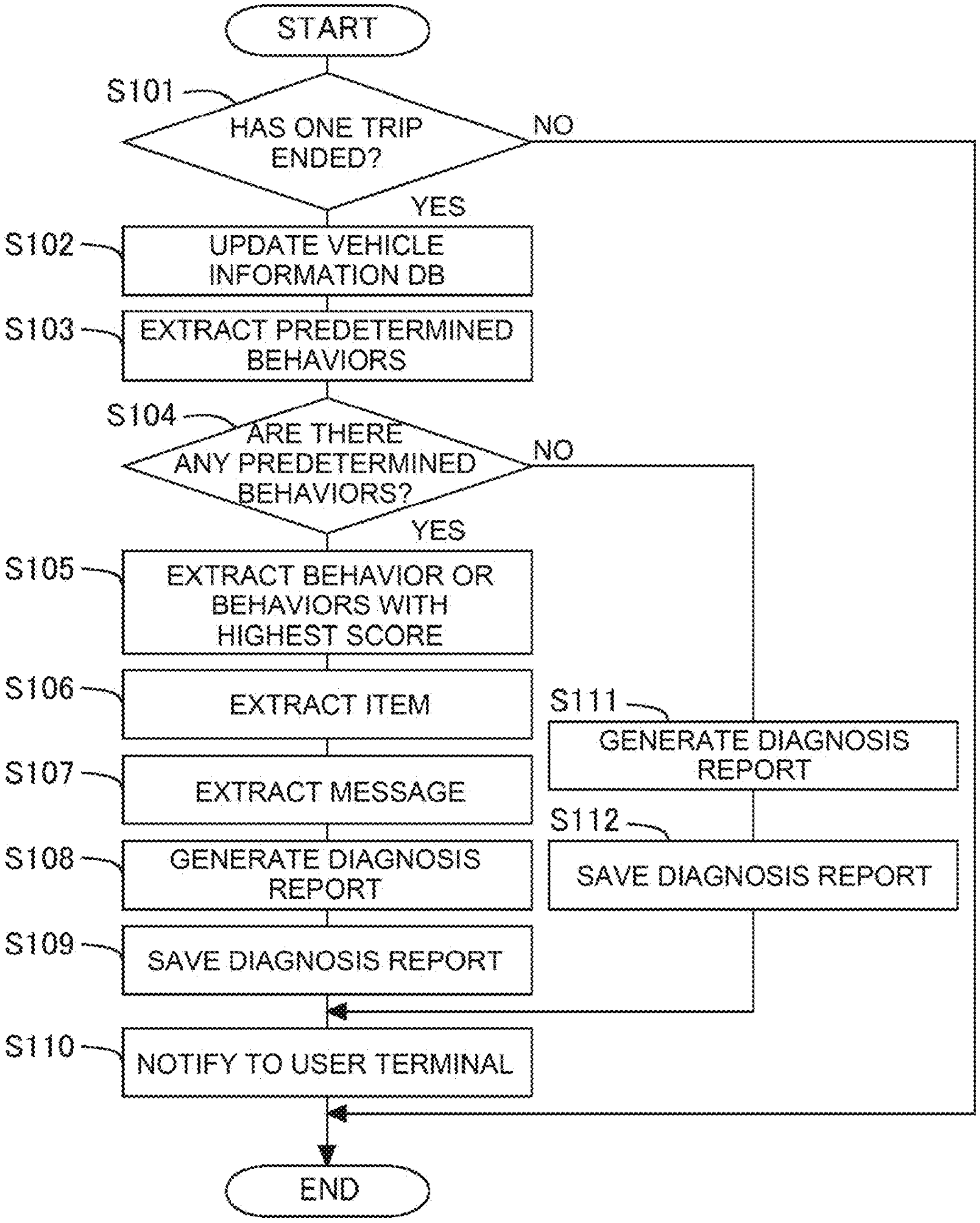

FIG. 11

START

S101 HAS ONE TRIP ENDED?

NO

YES

S102 UPDATE VEHICLE INFORMATION DB

S103 EXTRACT PREDETERMINED BEHAVIORS

S104 ARE THERE ANY PREDETERMINED BEHAVIORS?

NO

YES

S105 EXTRACT BEHAVIOR OR BEHAVIORS WITH HIGHEST SCORE

S106 EXTRACT ITEM

S107 EXTRACT MESSAGE

S108 GENERATE DIAGNOSIS REPORT

S109 SAVE DIAGNOSIS REPORT

S111 GENERATE DIAGNOSIS REPORT

S112 SAVE DIAGNOSIS REPORT

S110 NOTIFY TO USER TERMINAL

END

INFORMATION PROCESSING DEVICE AND INFORMATION PROCESSING METHOD

CROSS-REFERENCE TO RELATED APPLICATION

This application claims priority to Japanese Patent Application No. 2023-207068 filed on Dec. 7, 2023, incorporated herein by reference in its entirety.

BACKGROUND

1. Technical Field

This disclosure relates to an information processing device, an information processing method.

2. Description of Related Art

A related art has been disclosed in which a physical amount that changes based on at least one of traveling, steering, and braking of a vehicle or a physical amount that changes as a predetermined operation member is operated is detected, and a score of a driving operation is calculated based on a detection value (e.g., Japanese Unexamined Patent Application Publication No. 2022-138727 (JP 2022-138727 A)).

SUMMARY

This disclosure provides an information processing device, an information processing method, and a system that recommend an appropriate item to a user of a vehicle.

One aspect of this disclosure provides an information processing device.

This information processing device includes a processor. The processor is configured to execute:

- acquiring information related to driving of a user of a vehicle during a predetermined period;
- extracting one or more predetermined behaviors according to the acquired information related to the driving;
- determining one or more first items to be recommended to the user according to degrees of deviation from standard states of the one or more predetermined behaviors corresponding to the respective extracted one or more predetermined behaviors; and transmitting information related to the one or more first items to a terminal of the user.

Another aspect of this disclosure provides an information processing method executed by a computer. This information processing method includes:

- acquiring information related to driving of a user of a vehicle during a predetermined period;
- extracting one or more predetermined behaviors according to the acquired information related to the driving;
- determining one or more first items to be recommended to the user according to degrees of deviation from standard states of the one or more predetermined behaviors corresponding to the respective extracted one or more predetermined behaviors; and
- transmitting information related to the one or more first items to a terminal of the user.

Yet another aspect of this disclosure provides a system. This system includes:

- a vehicle;
- a terminal of a user of the vehicle; and
- a server.

The server includes a processor configured to execute:

- acquiring information related to driving of the user of the vehicle during a predetermined period from the vehicle;
- extracting one or more predetermined behaviors according to the acquired information related to the driving;
- determining one or more first items to be recommended to the user according to degrees of deviation from standard states of the predetermined behaviors corresponding to the respective extracted predetermined behaviors; and
- transmitting information related to the one or more first items to the terminal of the user.

Another aspect of this disclosure provides an information processing device includes a processor. The processor is configured to execute:

- acquiring information related to driving of a driver of a vehicle during a predetermined period;
- extracting one or more predetermined actions according to the acquired information related to the driving;
- determining one or more first items to be provided to the driver according to degrees of deviation from standard states of the one or more predetermined actions corresponding to the respective extracted one or more predetermined actions; and
- transmitting information related to the one or more first items to a terminal of the driver.

Still another aspect of this disclosure is a program that makes a computer execute the above-described information processing method, or a storage medium that non-transitorily stores that program.

According to this disclosure, an appropriate item can be recommended to a user of a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a view illustrating the table configuration of detection data according to the first embodiment;

FIG. 6 is a view illustrating the table configuration of item data according to the first embodiment;

FIG. 7 is a view showing the table configuration of message data;

FIG. 10 is a view showing the functional configuration of the user terminal according to the first embodiment;

FIG. 11 is a flowchart of a process of generating a diagnosis report in the server according to the first embodiment;

DETAILED DESCRIPTION OF EMBODIMENTS

Figure 1:
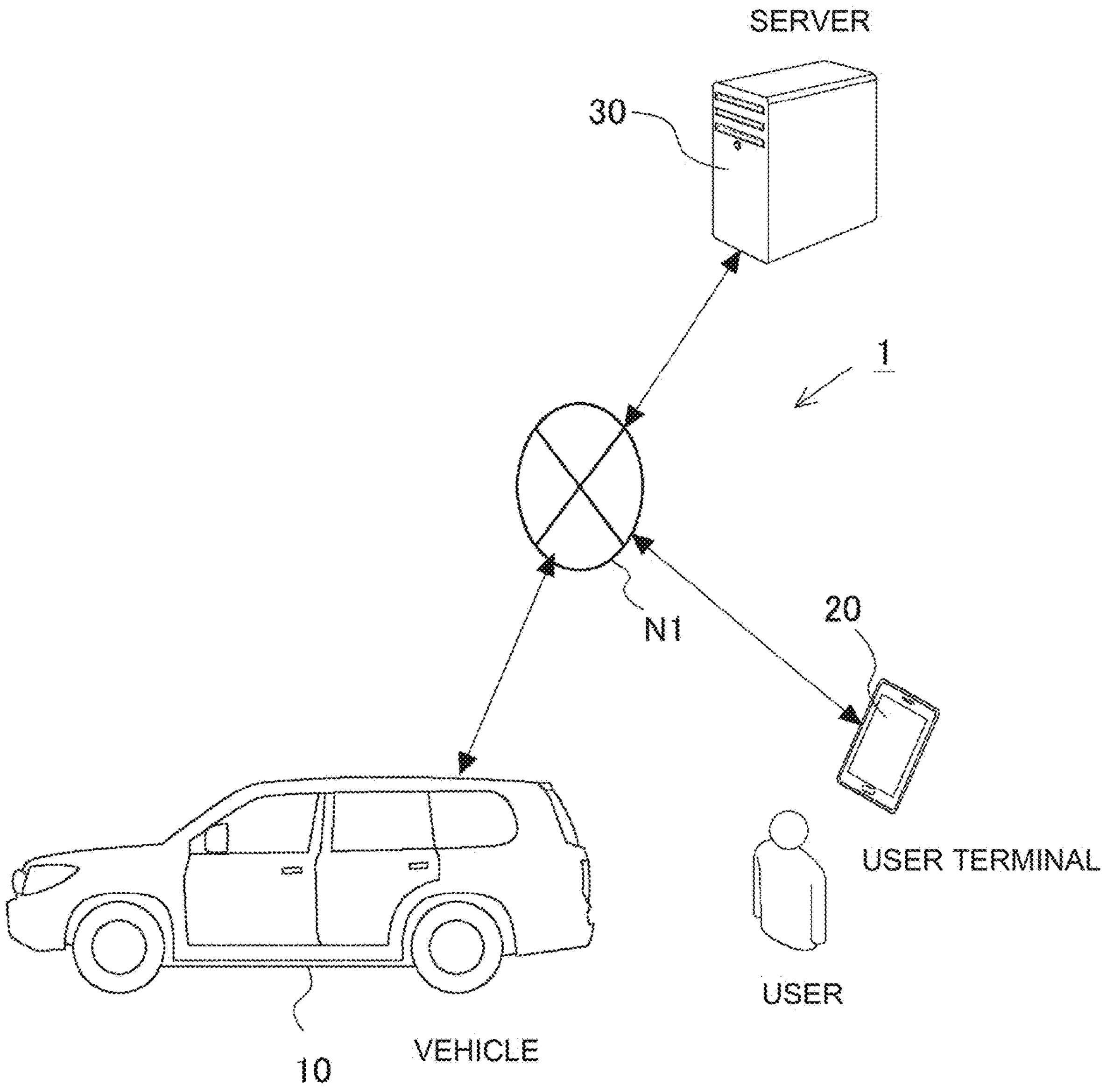
FIG. 1 is a view showing the schematic configuration of a system according to a first embodiment.

In a driving diagnosis system, it is conceivable to recommend an item to a user based on a result of a driving diagnosis. For example, when sudden acceleration is detected as a behavior of the vehicle, it is conceivable to recommend an item that mitigates sudden acceleration, such as Plus Support Key. Plus Support Key is a key that unlocks doors of a vehicle 10, and when the doors are unlocked by Plus Support Key, excessive pressing and mistaken pressing of the accelerator are detected on the vehicle side to mitigate the acceleration. Further, for example, when sudden braking is detected during backing as a behavior of the vehicle, it is conceivable to recommend a parking support brake (PKSB). The PKSB is a system that gives an alarm and performs brake control when an actuation target is detected during low-speed travel, such as during parking. Furthermore, for example, when it is detected during a lane change that the steering wheel is turned in the opposite direction from a lane to which the vehicle is changing the lane, or when sudden braking is detected during a lane change, it is conceivable to recommend a blind spot monitor (BSM). The BSM is a system that assists the user in making decisions during a lane change by detecting approach of another vehicle from behind. Items can include software.

However, if a plurality of items is recommended to the user when a plurality of behaviors has been detected, the user may feel annoyed. As a result, the user may stop seeing the driving diagnosis itself.

As a solution, an information processing device that is one aspect of this disclosure determines an item to be recommended to the user based on information related to the user's driving. More specifically, the information processing device that is one aspect of this disclosure includes a control unit configured to execute: acquiring the information related to the driving of the user of the vehicle during a predetermined period; extracting one or more predetermined behaviors according to the acquired information related to the driving; determining one or more first items to be recommended to the user according to degrees of deviation from standard states of the predetermined behaviors corresponding to the respective extracted predetermined behaviors; and transmitting information related to the first items to a terminal of the user.

The predetermined period is a period that is defined to recommend an item to the user, or a period that is defined to perform a driving diagnosis, and is, for example, one trip. One trip is a unit of travel from when a system power source of the vehicle is turned on until the system power source is shut down. This predetermined period may be a period from power-on (or maybe IG-ON) to power-off (or maybe IG-OFF). As another example, the predetermined period may be a period of traveling a predetermined distance. The information related to the user's driving is, for example, information detected by an output value of a sensor transmitted from the vehicle.

The user of the vehicle is a user linked to the vehicle. The predetermined behavior is a behavior against which the user should be cautioned. Examples of predetermined behaviors include sudden acceleration, sudden braking during backing, reverse steering during a lane change, and sudden braking during a lane change. The predetermined behavior may be a behavior of the vehicle that can be improved by an item that assists the user in driving. Further, the predetermined behavior may be, for example, a behavior of the vehicle that may cause trouble to surrounding vehicles, or may cause an accident, or may reduce the fuel efficiency. The predetermined behavior is extracted based on, for example, an output value of a sensor transmitted from the vehicle. There are a plurality of types of predetermined behaviors. Each of the predetermined behaviors can be improved by an item that assists the user in driving. The corresponding item varies according to the predetermined behavior. One example of items is a system that assists the user in driving. This item is not limited to hardware and can also include software.

When a plurality of predetermined behaviors is extracted, the control unit does not always recommend all the items corresponding to the respective predetermined behaviors to the user. That is, the control unit determines a first item to be recommended to the user according to degrees of deviation from standard states of the predetermined behaviors corresponding to the respective extracted predetermined behaviors. The standard state is, for example, a state that serves as a standard corresponding to each predetermined behavior, and is, for example, a state based on which a predetermined behavior can be determined to have occurred. As another example, the standard state of a predetermined behavior may be a driving state of the vehicle in which it is not determined that a predetermined behavior has occurred. The degree of deviation from the standard state of the predetermined behavior may be a degree of deviation from an appropriate driving state. For example, in the case where the predetermined behavior is sudden acceleration, the degree of deviation may be regarded to be higher as the acceleration becomes higher. The control unit may calculate this degree of deviation as a score. This score is a value that quantifies the magnitude of the behavior of the vehicle, and, for example, the score may become higher as an amount of change in the action of the vehicle becomes larger. For example, in the case where the predetermined behavior is sudden acceleration, a threshold value may be set for an acceleration operation amount, and a ratio of a detection value of the accelerator operation amount to the threshold value may be used as the score.

Further, the control unit determines one or more first items to be recommended to the user according to the above-described degree of deviation. The first item is an item that can lower the above-described degree of deviation or help prevent the occurrence of the predetermined behavior. A relationship between the predetermined behavior and the item may be stored in a storage unit. The control unit can recommend the item to the user by transmitting information related to the first item to the terminal of the user. The terminal of the user may be installed with application software (hereinafter also referred to as an "app") that displays an item according to information transmitted by the control unit.

In this way, the first item corresponding to the predetermined behavior with the high degree of deviation can be recommended to the user. The higher this degree of deviation is, the more likely it is that the behavior remains in the user's memory, so that an item that is satisfactory for the user can be recommended. Therefore, it is less likely that the user may feel annoyed.

In the following, embodiments of this disclosure will be described based on the drawings. The configurations of the following embodiments will be shown as examples, and this disclosure is not limited to the configurations of the embodiments. The following embodiments can be combined as far as possible.

First Embodiment

FIG. 1 is a view showing the schematic configuration of a system 1 according to a first embodiment. The system 1 is a system in which a server 30 performs a driving diagnosis based on information related to travel of a vehicle 10 and recommends an item that is highly related to the result of the driving diagnosis to a user.

In the example of FIG. 1, the system 1 includes the vehicle 10, a user terminal 20, and the server 30. The user terminal 20 is a mobile terminal owned by the user. The user terminal 20 is registered in the server 30 so as to be linked to the vehicle 10, and by using the user terminal 20, the user can refer to a diagnosis report generated about the vehicle 10. The server 30 performs a driving diagnosis and generates a diagnosis report that can be referred to by the user terminal 20.

The vehicle 10, the user terminal 20, and the server 30 are connected to one another by a network N1. The network N1 is, for example, a worldwide public communication network, such as the Internet, and a wide area network (WAN) or other communication networks may be adopted. The network N1 may include a telephone communication network, such as a mobile-phone network, and a wireless communication network, such as Wi-Fi®. While one vehicle 10 is shown as an example in FIG. 1, there can be a plurality of vehicles 10. There can be a plurality of users and a plurality of user terminals 20 according to the number of the vehicles 10.

Figure 2:
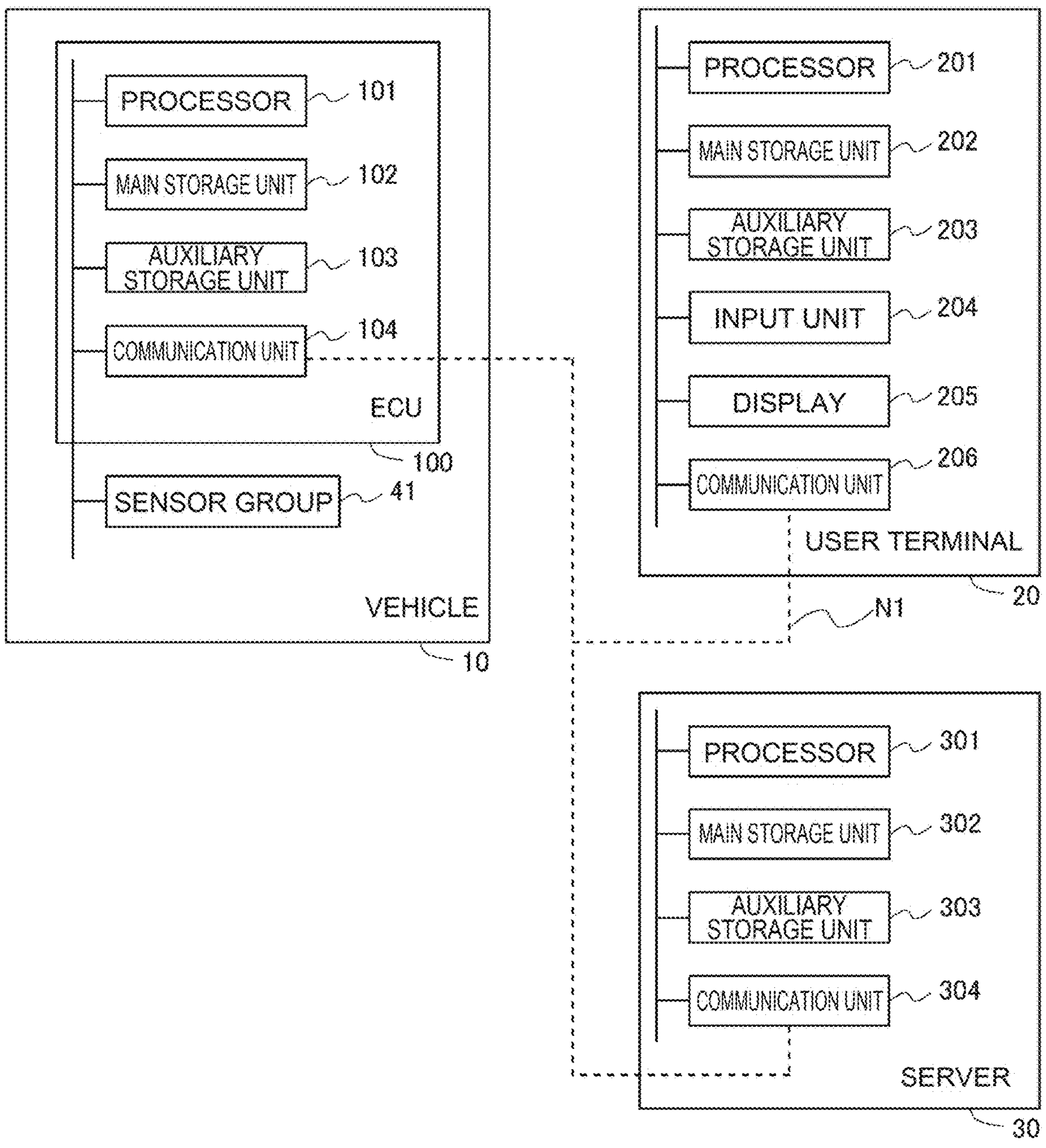
FIG. 2 is a block diagram schematically showing one example of the configuration of each of a vehicle, a user terminal, and a server composing the system according to the first embodiment.

The hardware configurations of the vehicle 10, the user terminal 20, and the server 30 will be described based on FIG. 2. FIG. 2 is a block diagram schematically showing one example of the configuration of each of the vehicle 10, the user terminal 20, and the server 30 composing the system 1 according to the first embodiment.

The server 30 has a configuration of a computer. The server 30 has a processor 301, a main storage unit 302, an auxiliary storage unit 303, and a communication unit 304. These components are connected to one another by a bus. The processor 301 is one example of the control unit.

The processor 301 is a central processing unit (CPU), a digital signal processor (DSP), or the like. The processor 301 controls the server 30 and performs various calculations for information processing. The main storage unit 302 is a random-access memory (RAM), a read-only memory (ROM), or the like. The auxiliary storage unit 303 is an erasable programmable ROM (EPROM), a hard disk drive (HDD), a removal medium, or the like. In the auxiliary storage unit 303, an operating system (OS), various programs, various tables, and others are stored. The processor 301 loads a program stored in the auxiliary storage unit 303 to a work area of the main storage unit 302 and executes this program, and each constituent part etc. is controlled through execution of this program. Thus, the server 30 realizes a function matching a predetermined purpose. The main storage unit 302 and the auxiliary storage unit 303 are computer-readable recording media. The server 30 may be a single computer or may be a plurality of computers cooperating with one another. The information stored in the auxiliary storage unit 303 may be stored in the main storage unit 302. The information stored in the main storage unit 302 may be stored in the auxiliary storage unit 303.

The communication unit 304 is means for communicating with the vehicle and the user terminal 20 via the network N1. The communication unit 304 is, for example, a local area network (LAN) interface board or a wireless communication circuit for wireless communication. The LAN interface board or the wireless communication circuit is connected to the network N1.

A series of processes executed in the server 30 can be executed by hardware as well as by software.

Next, the user terminal 20 will be described. The user terminal 20 is a small-sized computer, for example, a smartphone, a mobile phone, a tablet terminal, a personal information terminal, a wearable computer (e.g., a smartwatch), or a personal computer (PC). The user terminal 20 has a processor 201, a main storage unit 202, an auxiliary storage unit 203, an input unit 204, a display 205, and a communication unit 206. These components are connected to one another by a bus. The processor 201, the main storage unit 202, and the auxiliary storage unit 203 are the same as the processor 301, the main storage unit 302, and the auxiliary storage unit 303 of the server 30, and therefore description thereof will be omitted.

The input unit 204 is means for receiving an input operation performed by the user, and is, for example, a touch panel, a mouse, a keyboard, a microphone, or a push button. The display 205 is means for presenting information to the user, and is, for example, a liquid crystal display (LCD) or an electroluminescence (EL) panel. The input unit 204 and the display 205 may be configured as one touch panel display.

The communication unit 206 is communication means for connecting the user terminal 20 to the network N1. The communication unit 206 is, for example, a circuit for communicating with another device (e.g., the vehicle 10 or the server 30) via the network N1 using a wireless communication network, such as a mobile communication service (e.g., telecommunication network such as 6th generation (6G), 5th generation (5G), 4th generation (4G), 3rd generation (3G), or long-term evolution (LTE)), Wi-Fi®, or Bluetooth®.

Next, the vehicle 10 will be described. The vehicle 10 includes an ECU 100 that is an electronic control unit and a sensor group 41. These constituent elements are connected to each other by a CAN bus that is a bus of an in-vehicle network. These constituent elements may, instead of each being a single module, be realized by a combination of on-board devices, such as a car navigation system, or on-board communication devices.

The ECU 100 has a configuration of a computer. The ECU 100 includes a processor 101, a main storage unit 102, an auxiliary storage unit 103, and a communication unit 104. These components are connected to one another by a bus. The processor 101, the main storage unit 102, the auxiliary storage unit 103, and the communication unit 104 are the same as the processor 201, the main storage unit 202, the auxiliary storage unit 203, and the communication unit 206 of the user terminal 20, and therefore description thereof will be omitted.

The sensor group 41 includes, for example, sensors that detect states of the vehicle 10 and sensors or the like that detect actions of the driver. The sensor group 41 includes, for example, a speed sensor, acceleration sensor, accelerator operation amount sensor, steering wheel angle sensor, yaw rate sensor, winker switch sensor (a sensor that detects a state of a switch of a direction indicator), shift position sensor, position information sensor (GPS sensor), and a brake switch. The sensor group 41 may further include a sensor that detects that a system such as a pre-crash safety system has been actuated.

Figures 3, 4:
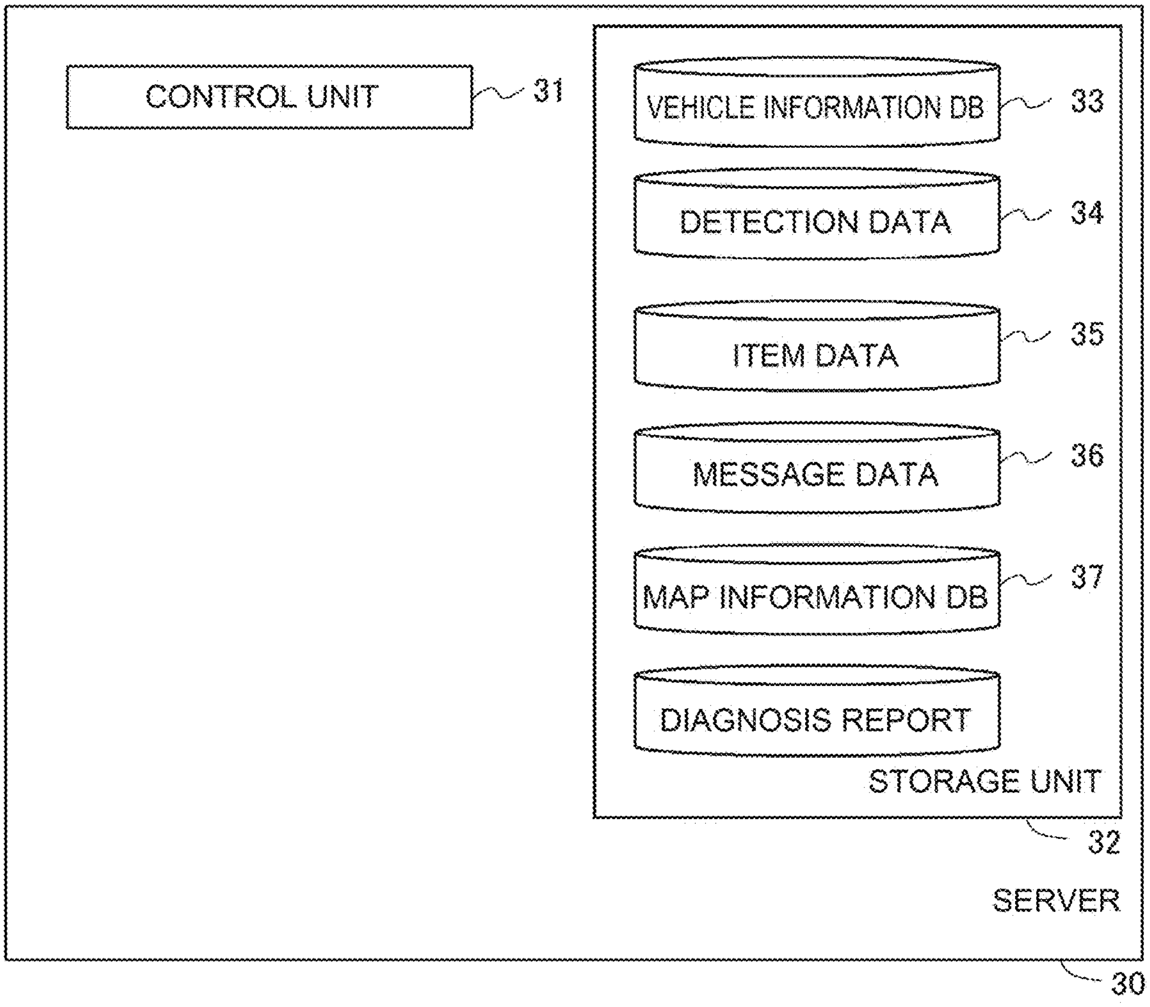
FIG. 3 is a view illustrating the functional configuration of the server according to the first embodiment.
FIG. 4 is a view illustrating the table configuration of a vehicle information DB according to the first embodiment.

Next, functions of the server 30 will be described. FIG. 3 is a view illustrating the functional configuration of the server 30 according to the first embodiment. The server 30 includes a control unit 31 and a storage unit 32 as functional constituent elements. The processor 301 of the server 30 executes processes of the control unit 31 by computer programs in the main storage unit 302. The storage unit 32 is configured to include the main storage unit 302 and the auxiliary storage unit 303. The storage unit 32 stores a vehicle information DB 33, detection data 34, item data 35, message data 36, map information DB 37, and a diagnosis report. The vehicle information DB 33 and the map information DB 37 are, for example, relational databases.

In the map information DB 37, map information is stored including map data that includes positions of features, and point-of-interest (POI) information, such as letters and pictures, that shows the characteristics of each point in that map data. The map information DB 37 may be provided from another system connected to the network N1, for example, a geographic information system (GIS).

Upon receiving vehicle information from the vehicle 10, the control unit 31 stores the vehicle information in the vehicle information DB 33. The vehicle information is information related to travel of the vehicle 10. Here, FIG. 4 is a view illustrating the table configuration of the vehicle information DB 33 according to the first embodiment. The vehicle information DB 33 has fields for a vehicle ID, a user ID, a time and date, a position, and a sensor detection value. A record is added to the vehicle information DB 33 each time the vehicle information is received from the vehicle 10. For example, the vehicle information may be collectively transmitted from the vehicle 10 to the server 30 once every trip, or may be transmitted from the vehicle 10 to the server 30 once every predetermined time.

In the vehicle ID field, information that allows identification of the vehicle (vehicle ID) is stored. In the user ID field, information that allows identification of the user linked to the vehicle 10 (user ID) is stored. This user ID is linked to the vehicle ID and the user terminal 20. In the time and date field, information related to the time and date of detection by the sensor group 41 is stored. In the position field, information related to the position of the vehicle 10 corresponding to the time and date is stored. In the sensor detection value field, each detection value of the sensor group 41 is stored.

The control unit 31 generates the detection data 34 based on the vehicle information stored in the vehicle information DB 33. FIG. 5 is a view illustrating the table configuration of the detection data 34 according to the first embodiment. The detection data 34 is data that shows the time and the position at which a predetermined behavior of the vehicle 10 has occurred, and a score corresponding to the predetermined behavior. The detection data 34 is generated once every trip for each vehicle 10. The detection data 34 has fields for the behavior, the time, the position, and the score. In the behavior field, a predetermined behavior of the vehicle 10 that has occurred is input. The predetermined behavior of the vehicle 10 is detected based on the item data 35 to be described later. Examples of predetermined behaviors include sudden acceleration, sudden braking during backing, reverse steering during a lane change, and sudden braking during a lane change. The detection data 34 is not limited to being generated once every trip, and may instead be generated, for example, each time a predetermined distance is traveled or each time a predetermined time elapses.

Here, FIG. 6 is a view illustrating the table configuration of the item data 35 according to the first embodiment. The item data 35 is data related to a condition for determining that a predetermined behavior has occurred, and an item corresponding to the predetermined behavior. The item data 35 has fields for the behavior, the condition, and the item. In the behavior field, predetermined behaviors of the vehicle 10 to be detected are input. The predetermined behaviors include sudden acceleration, sudden braking during backing, reverse steering during a lane change, sudden braking during a lane change, etc.

Sudden acceleration is a predetermined behavior in which acceleration of the vehicle 10 exceeds a threshold value. As acceleration of the vehicle 10 is correlated with the accelerator operation amount, the control unit 31 detects sudden acceleration when the accelerator operation amount becomes equal to or larger than the threshold value. The accelerator operation amount is detected by the accelerator operation amount sensor included in the sensor group 41 of the vehicle 10. The item corresponding to the behavior of sudden acceleration is an item that mitigates sudden acceleration due to mistaken pressing or excessive pressing of the accelerator, and is, for example, Plus Support Key. When the control unit 31 detects sudden acceleration, the control unit 31 inputs "sudden acceleration" into the behavior field of the detection data 34, and inputs the time, the position, and the score in the same record.

Sudden braking during backing is a predetermined behavior in which deceleration acceleration exceeds a threshold value while the vehicle 10 is backing. Deceleration acceleration of the vehicle 10 is detected by the acceleration sensor included in the sensor group 41 of the vehicle 10. That the vehicle 10 is backing is detected by, for example, the shift position sensor and the speed sensor. The item corresponding to sudden braking during backing is an item that gives an alarm and performs brake control when an actuation target is detected during low-speed travel such as during parking, and is, for example, a PKSB. When the control unit 31 detects sudden braking during backing, the control unit 31 inputs "sudden braking during backing" into the behavior field of the detection data 34 and inputs the time, the position, and the score into the same record.

Reverse steering during a lane change is a predetermined behavior in which, during a lane change, the steering wheel is turned in the opposite direction from a lane to which the vehicle 10 is changing the lane. For example, when the flashing direction of the direction indicator detected by the winker switch sensor included in the sensor group 41 and the direction in which the steering wheel is turned that is detected by the steering wheel angle sensor included in the sensor group 41 are opposite and, moreover, the changing speed or the changing acceleration of the steering wheel angle is equal to or higher than a threshold value, the control unit 31 detects that the behavior of reverse steering during a lane change has occurred. The item corresponding to reverse steering during a lane change is an item that assists the user in making decisions during a lane change by detecting approach of another vehicle from behind, and is, for example, a BSM. When the control unit 31 detects reverse steering during a lane change, the control unit 31 inputs "reverse steering during a lane change" into the behavior field of the detection data 34, and inputs the time, the position, and the score into the same record.

Sudden braking during a lane change is a predetermined behavior in which deceleration acceleration during a lane change of the vehicle 10 exceeds a threshold value. For example, when actuation of the direction indicator is detected by the winker switch sensor included in the sensor group 41 and, moreover, deceleration acceleration detected by the acceleration sensor included in the sensor group 41 of the vehicle 10 exceeds a threshold value, the control unit 31 detects that the behavior of sudden braking during a lane change has occurred. The item corresponding to sudden braking during a lane change is an item that assists the user in making decisions during a lane change by detecting approach of another vehicle from behind, and is, for example, a BSM. When the control unit 31 detects sudden braking during a lane change, the control unit 31 inputs "sudden braking during a lane change" into the behavior field of the detection data 34, and inputs the time, the position, and the score into the same record.

Turning back to FIG. 5, in the time field, information related to the time at which the predetermined behavior has occurred is input. In the time field, information related to the time of day, or an elapsed time since the start of travel is input. In the position field, information related to the position at which the predetermined behavior has occurred is input. This position is a position of the vehicle 10 detected by the position information sensor included in the sensor group 41 of the vehicle 10. In the score field, a numerical value corresponding to the magnitude of the behavior is input.

For example, when an accelerator operation amount equal to or larger than a predetermined value is detected, the control unit 31 detects that the behavior of sudden acceleration has occurred. Here, the larger the accelerator operation amount is, the higher the score is that is input into the score field. The score indicates a degree of deviation from a standard state when a predetermined behavior of the vehicle 10 has occurred. For example, a case where the accelerator operation amount is at the threshold value is set as the standard state. This threshold value is the threshold value that is used to determine that the predetermined behavior has occurred. A ratio of the detected accelerator operation amount to this threshold value may be used as the score. The threshold value may be a target value, a standard value, or a value at which no problem arises. For example, a value of the accelerator operation amount at which the behavior of the vehicle 10 raises no problem may be set as the threshold value, and a ratio of the detected accelerator operation amount to this threshold value may be used as the score. In this case, when the score is equal to or higher than a predetermined score, it may be determined that the behavior of sudden acceleration has occurred. The score is equivalent to the degree of deviation from a threshold value of a physical amount.

For example, when deceleration acceleration equal to or higher than a predetermined value is detected during backing, the control unit 31 detects that the behavior of sudden braking during backing has occurred. Here, the higher the deceleration acceleration is, the higher the score is that is input into the score field. For example, a case where deceleration acceleration is at the threshold value is set as the standard state. This threshold value is the threshold value that is used to determine that the predetermined behavior has occurred. A ratio of the detected deceleration acceleration to this threshold value may be used as the score. As another example, for example, a value of deceleration acceleration at which the behavior of the vehicle 10 raises no problem may be set as the threshold value, and a ratio of the detected deceleration acceleration to this threshold value may be used as the score. In this case, when the score during backing is equal to or higher than the predetermined score, it may be determined that the behavior of sudden braking during backing has occurred.

For example, when the steering wheel is turned in the reverse direction during a lane change, and a changing speed of the steering wheel angle equal to or higher than a predetermined value is detected in the process, the control unit 31 detects that the behavior of reverse steering has occurred during a lane change. Here, the higher the speed or the acceleration of rotating the steering wheel is, the higher the score is that is input into the score field. For example, a case where the speed or the acceleration of rotating the steering wheel is at the threshold value is set as the standard state. This threshold value is the threshold value that is used to determine that the predetermined behavior has occurred. A ratio of the detected speed or acceleration of rotating the steering wheel to this threshold value may be used as the score. As another example, for example, a value of the speed or the acceleration of rotating the steering wheel at which the behavior of the vehicle 10 raises no problem may be set as the threshold value, and a ratio of the detected speed or acceleration of rotating the steering wheel to this threshold value may be used as the score. In this case, when the score during a lane change is equal to or higher than a predetermined score, it may be determined that the behavior of reverse steering during a lane change has occurred.

For example, when deceleration acceleration equal to or higher than a predetermined value is detected during a lane change, the control unit 31 detects that the behavior of sudden braking during a lane change has occurred. Here, the higher the deceleration acceleration is, the higher the score is that is input into the score field. For example, a case where deceleration acceleration is at the threshold value is set as the standard state. This threshold value is the threshold value that is used to determine that the predetermined behavior has occurred. A ratio of the detected deceleration acceleration to this threshold value may be used as the score. As another example, for example, a value of deceleration acceleration at which the behavior of the vehicle 10 raises no problem may be set as the threshold value, and a ratio of the detected deceleration acceleration to this threshold value may be used as the score. In this case, when the score during a lane change is equal to or higher than a predetermined score, it may be determined that the behavior of sudden braking during a lane change has occurred.

The control unit 31 transmits, to the user terminal 20, information related to the behavior of the vehicle 10 and information related to the item once every trip of the vehicle 10. Here, a command that makes the display 205 of the user terminal 20 display the information related to the behavior of the vehicle 10 and the information related to the item may be included. The transmission of the information related to the behavior of the vehicle and the information related to the item to the user terminal 20 is not limited to once every trip, and may instead be performed, for example, each time a predetermined distance is traveled or each time a predetermined time elapses.

Here, when a predetermined behavior is detected multiple times, if all the items corresponding to all these predetermined behaviors are presented to the user, the number of the recommended items is so large that the user may feel annoyed. Moreover, it is difficult for the user to determine which item to select. In this embodiment, therefore, the control unit 31 narrows down the items to be recommended to the user to one item and recommends that one item to the user. On that occasion, a message related to the behavior of the vehicle 10 corresponding to that item is also transmitted to the user terminal 20.

The control unit 31 determines whether any of the predetermined behaviors shown in FIG. 6 has occurred based on the detection values of the sensor group 41 transmitted from the vehicle 10. When any predetermined behavior has occurred, the control unit 31 stores that information in the detection data 34 along with information related to each of the time and the position at which the predetermined behavior has occurred and the score. The control unit 31 may detect whether any predetermined behavior has occurred, either successively during travel of the vehicle 10 or at once after the end of travel of the vehicle 10.

The control unit 31 refers to the detection data 34 and extracts a record with the highest score in one trip. Then, the control unit 31 extracts the predetermined behavior stored in the behavior field of the extracted record. This predetermined behavior can be said to be a behavior with the highest degree of deviation from the standard state. Further, the control unit 31 refers to the item data 35 and extracts the item corresponding to the extracted predetermined behavior. Thus, the control unit 31 determines the item to be recommended to the user. The item thus determined is one example of the first item. Further, the control unit 31 refers to the message data 36 and extracts the message corresponding to the extracted behavior. Here, FIG. 7 is a view showing the table configuration of the message data 36. The message data 36 has fields for the behavior and the message. In the behavior field, information related to the same predetermined behavior is input as in the behavior field of the item data 35 shown in FIG. 6. In the message field, information related to the message corresponding to the predetermined behavior is input.

The control unit 31 generates a diagnosis report once every trip. When a predetermined behavior is extracted, the control unit 31 generates a diagnosis report including a message corresponding to the predetermined behavior and a message recommending an item. For example, the diagnosis report presents the user with information that a predetermined behavior has been detected, an item recommended to the user, reasons for recommending that item, and advantages of installing that item in the vehicle 10. In this embodiment, even when a plurality of predetermined behaviors is detected during one trip, only the predetermined behavior with the highest score in the one trip is presented, and further, one item corresponding to the predetermined behavior with the highest score is recommended to the user. The control unit 31 stores the generated diagnosis report in the storage unit 32. The predetermined behavior presented to the user is one example of the first behavior.

When the control unit 31 has generated the diagnosis report in the trip in which the predetermined behavior has occurred, the control unit 31 notifies the user terminal that it has generated a diagnosis report. For example, using a push notification or an e-mail, the control unit 31 makes the display 205 of the user terminal 20 display a notification that a diagnosis report has been generated, a notification that prompts the user to see the diagnosis report, a notification that a predetermined behavior has been detected, etc. The diagnosis report is stored in the auxiliary storage unit 303, and the user can see the diagnosis report at any time by accessing it from the user terminal 20. On request from the user terminal 20, the control unit 31 generates a command for displaying an item and a message on the display 205 of the user terminal 20 and transmits the command to the user terminal 20. As another example, after generating a diagnosis report, the control unit 31 may transmit the diagnosis report to the user terminal 20, and the diagnosis report may be stored in the auxiliary storage unit 203 of the user terminal 20. Then, the diagnosis report may be displayed when the user starts the app.

Figure 8:
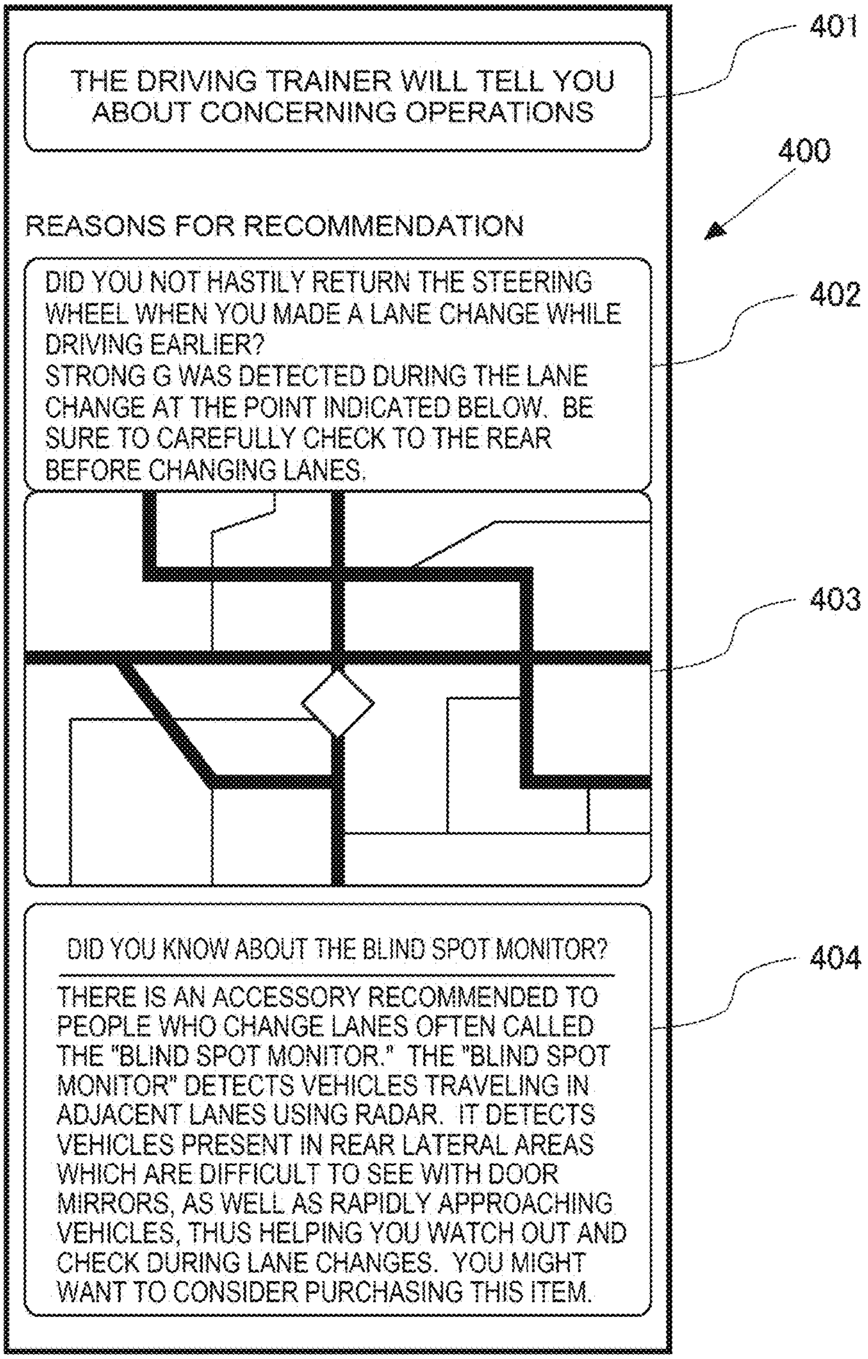
FIG. 8 is a view showing one example of an image displayed on a display of the user terminal.

Here, FIG. 8 is a view showing one example of a screen 400 displayed on the display 205 of the user terminal 20. This screen 400 is a screen displaying a diagnosis report. When the user starts and operates the app by which a diagnosis report can be referred to in the user terminal 20, the screen 400 shown in FIG. 8 is displayed on the display 205 of the user terminal 20. The message shown in FIG. 8 is a message stored in the message data 36.

The message denoted by reference sign 401 in FIG. 8 is a message informing the user that a predetermined behavior has been detected. The message denoted by reference sign 401 may have the same contents regardless of the detected behavior or may have contents according to the detected behavior.

The message denoted by reference sign 402 in FIG. 8 is a message informing the contents of the detected predetermined behavior and an advice on driving. The message denoted by reference sign 402 is a message corresponding to the predetermined behavior.

In the map denoted by reference sign 403 in FIG. 8, the position at which the predetermined behavior has been detected is indicated. The position at which the predetermined behavior has been detected is a position included in the detection data 34. By referring to the map information DB 37, the control unit 31 acquires and displays map information on a predetermined area around the position at which the predetermined behavior has been detected, and displays a mark (e.g., a rhombus) indicating that a predetermined behavior has occurred at the center of the map.

Further, the message denoted by reference sign 404 in FIG. 8 is a message describing the item corresponding to the detected behavior. The message denoted by reference sign 404 is a message corresponding to the extracted item.

In this way, even when a plurality of predetermined behaviors is detected, a diagnosis report and an item for one predetermined behavior are presented to the user, so that the item that the user needs most can be recommended. It becomes possible for the user to immediately grasp the needed item.

Figure 9:
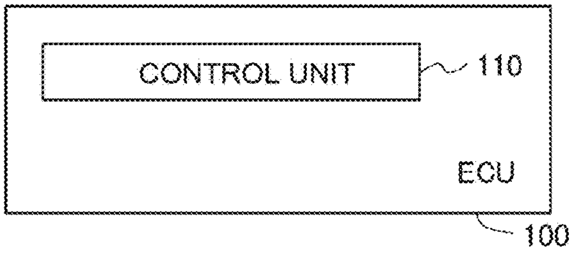
FIG. 9 is a view showing one example of functional constituent elements of an ECU according to the first embodiment.

Next, functional constituent elements of the ECU 100 of the vehicle 10 will be described. FIG. 9 is a view showing one example of the functional constituent elements of the ECU 100 according to the first embodiment. The ECU 100 includes a control unit 110 as a functional constituent element. The processor 101 of the ECU 100 executes processes of the control unit 110 by a computer program in the main storage unit 102. However, some of the functional constituent elements or some of their processes may be executed by a hardware circuit.

The control unit 110 transmits information related to each detection value of the sensor group 41 to the server 30 once every predetermined time or once every trip. Here, the control unit 110 transmits this information as vehicle information along with information required for a driving diagnosis, such as the vehicle ID, the user ID, the position information, and time and date information.

Next, functions of the user terminal 20 will be described. FIG. 10 is a view showing the functional configuration of the user terminal 20 according to the first embodiment. The user terminal 20 has a control unit 21 as a functional constituent element. The processor 201 of the user terminal 20 executes processes of the control unit 21 by a computer program in the main storage unit 202. However, some of the processes of the control unit 21 may be executed by a hardware circuit. The user terminal 20 is installed with the app by which a diagnosis report can be referred to.

The control unit 21 receives a diagnosis report from the server 30. A notification that a diagnosis report has been generated may be received before the diagnosis report is received. This notification may be, for example, a push notification, an SMS notification, or a notification by an e-mail. This notification may include a command that makes the display 205 display information that a diagnosis report has been generated. For example, upon receiving a push notification, the control unit 21 makes the display 205 display an image showing that a diagnosis report has been generated. As another example, upon receiving a diagnosis report from the server 30, the control unit 21 may notify the user that a diagnosis report has been received.

On the display 205 of the user terminal 20, a predetermined icon corresponding to the app by which a diagnosis report can be referred to is displayed. When the user taps on this icon, the control unit 21 starts the app by which a diagnosis report can be referred to. When the app is started by the control unit 21, the screen 400 shown in FIG. 8 is displayed. Here, the control unit 21 may access the server 30 and request information required to display the screen 400. As another example, the control unit 21 may receive a diagnosis report from the server 30 in advance and store it in the auxiliary storage unit 203. Then, the stored diagnosis report may be displayed when the user taps on the icon.

Next, the process of generating a diagnosis report in the server 30 will be described. FIG. 11 is a flowchart of the process of generating a diagnosis report in the server according to the first embodiment. The process shown in FIG. 11 is executed in the server 30 once every trip of the vehicle 10.

In step S101, the control unit 31 determines whether one trip of the vehicle has ended. The control unit 31 determines that one trip of the vehicle 10 has ended, when a signal relating to power-off (or maybe IG-OFF) is received from the vehicle 10. When the user presses a power switch for turning the power source of the vehicle 10 on, a signal corresponding to power-on is transmitted from the vehicle 10, and when the user presses the power switch again, a signal corresponding to power-off is transmitted. When the determination result of step S101 is in the affirmative, the process moves to step S102, and when the determination result is in the negative, the process ends.

In step S102, the control unit 31 updates the vehicle information DB 33 based on the vehicle information. The control unit 31 updates the vehicle information DB 33 by storing the vehicle information received from the vehicle 10 in the vehicle information DB 33.

In step S103, the control unit 31 extracts predetermined behaviors. The control unit 31 determines whether any predetermined behaviors have occurred by comparing the detection values of the sensor group 41 with the conditions in the item data 35. When it is determined that a predetermined behavior has occurred, the control unit 31 calculates a score corresponding to the predetermined behavior. Then, the control unit 31 updates the detection data 34 by storing the time, the position, and the score for each predetermined behavior that has occurred in the detection data 34.

In step S104, the control unit 31 determines whether any predetermined behaviors have occurred. In this step, the control unit 31 determines whether any predetermined behaviors have been extracted in step S103. When the determination result of step S104 is in the affirmative, the process moves to step S105, and when the determination result is in the negative, the process moves to step S111.

In step S105, the control unit 31 extracts a predetermined behavior with the highest score. The control unit 31 refers to the score field of the detection data 34 and extracts a record with the highest score. The control unit 31 extracts the behavior stored in the behavior field of this record as the behavior with the highest score. Here, the control unit 31 also extracts the corresponding time and position. When there is a plurality of behaviors with the same score, one predetermined behavior among these behaviors may be randomly extracted, or a predetermined behavior with the largest number of times of occurrence may be extracted, or a predetermined behavior that has occurred last may be extracted.

For example, in the case where the same predetermined behavior has occurred multiple times, the larger that number of times is, the more likely it is that the predetermined behavior remains in the user's memory. By recommending the item corresponding to such a predetermined behavior, an item that is satisfactory for the user can be recommended. In the case where different predetermined behaviors have occurred, the predetermined behavior that has occurred last is likely to remain in the user's memory. By recommending the item corresponding to such a predetermined behavior, an item that is satisfactory for the user can be recommended.

In step S106, the control unit 31 extracts an item to be recommended to the user. The control unit 31 extracts the item corresponding to the predetermined behavior extracted in step S105 by referring to the item data 35. Further, in step S107, the control unit 31 extracts a message to be presented to the user. The control unit 31 extracts the message corresponding to the predetermined behavior extracted in step S105 by referring to the message data 36.

In step S108, the control unit 31 generates a diagnosis report. This diagnosis report includes the message corresponding to the predetermined behavior extracted in step S105, description of the item recommended to the user, etc. For example, the control unit 31 generates the image shown in FIG. 8 as a diagnosis report. Then, in step S109, the control unit 31 saves the diagnosis report in the storage unit 32.

On the other hand, in step S111, the control unit 31 generates a diagnosis report for the case where no predetermined behavior has occurred. This diagnosis report may include, for example, a message related to no predetermined behavior having occurred. This message may include a message complimenting the user on his or her driving. Then, in step S112, the control unit 31 saves the diagnosis report in the storage unit 32.

In step S110, the control unit 31 transmits a notification that a diagnosis report has been issued to the user terminal 20. When a request for displaying the diagnosis report is received from the user terminal 20 in response to this notification, the control unit 31 transmits the diagnosis report to the user terminal 20. As another example, in step S110, the control unit 31 may transmit the diagnosis report to the user terminal 20.

Figure 12:
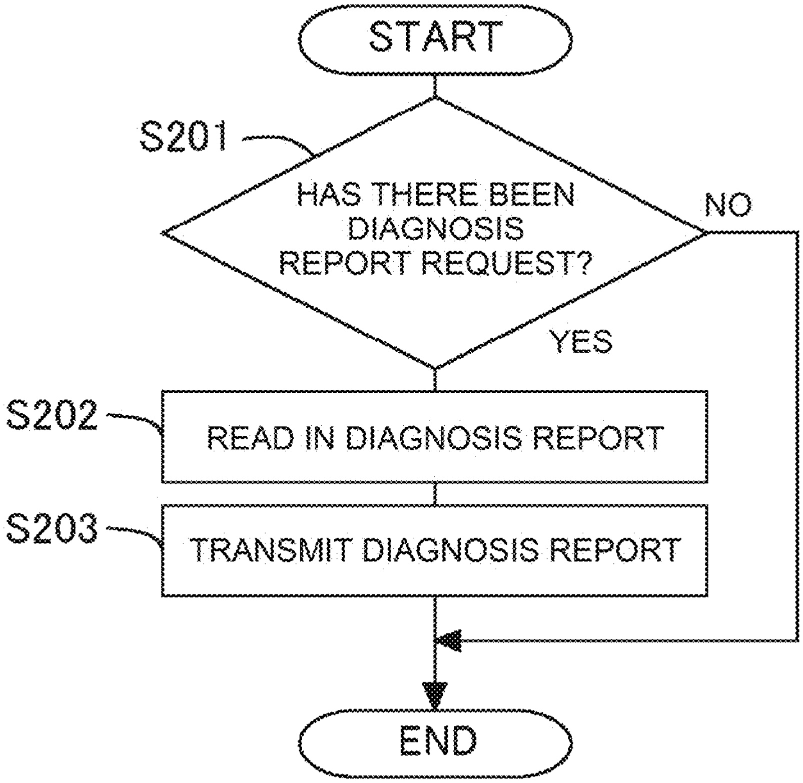
FIG. 12 is a flowchart of a process of transmitting a diagnosis report in the server according to the first embodiment.

FIG. 12 is a flowchart of the process of transmitting a diagnosis report in the server 30 according to the first embodiment. The process shown in FIG. 12 is executed in the server 30 once every predetermined time. In step S201, the control unit 31 determines whether there has been a diagnosis report request from the user terminal 20. The diagnosis report request is a request for information required to display a diagnosis report on the display 205 of the user terminal 20. The diagnosis report request is generated when the user taps on the icon corresponding to the app by which a diagnosis report can be referred to in the user terminal 20, and is transmitted to the server 30. The diagnosis report request is linked to the user ID and the vehicle ID. When the determination result of step S201 is in the affirmative, the process moves to step S202, and when the determination result is in the negative, the process ends.

In step S202, the control unit 31 reads in the diagnosis report corresponding to the diagnosis report request from the storage unit 32. Then, in step S203, the control unit 31 transmits the diagnosis report to the user terminal 20. Here, a command for displaying the diagnosis report on the user terminal 20 is also transmitted.

As has been described above, according to this embodiment, when a plurality of predetermined behaviors is detected, only one item to be recommended to the user is determined and presented to the user along with a message. Thus, the user who sees the diagnosis report can easily know that there has been a problem with his or her driving and an item that suits himself or herself. Having been determined based on the score, this item can be an item corresponding to a behavior that remains in the user's memory. Therefore, an item that is satisfactory for the user can be recommended. Since no plurality of items is recommended, the user is less likely to feel annoyed. As a result, the user starts to willingly see the app and can make better use of the app. In addition, the user is more likely to purchase an item.

Second Embodiment

In the second embodiment, items corresponding to behaviors with a score equal to or higher than a threshold value are all recommended to the user. The threshold value here is a score at which it is considered advisable to install the item in the vehicle 10. The threshold value may be determined by the control unit 31 or may be determined by the user.

Figure 13:
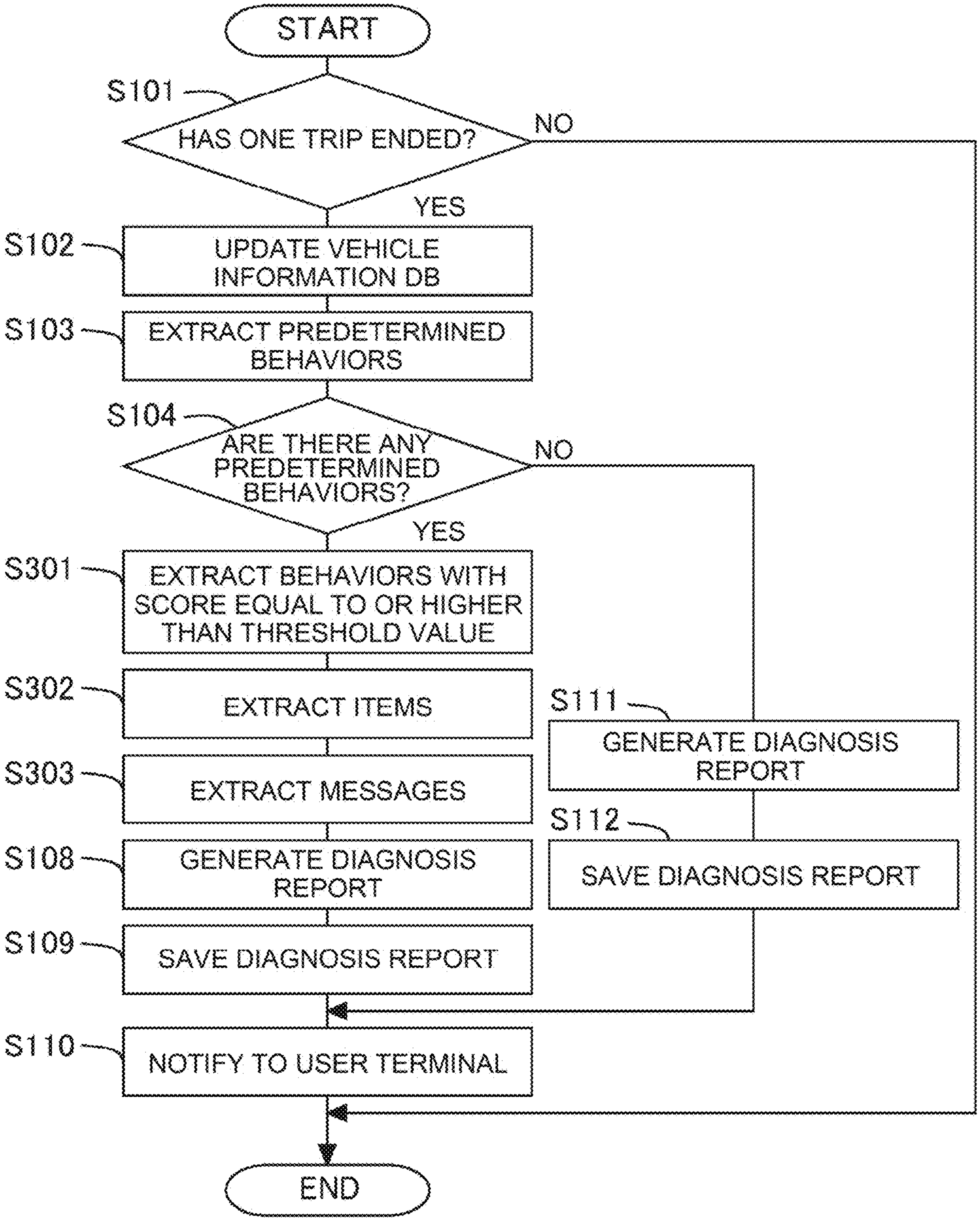
FIG. 13 is a flowchart of a process of generating a diagnosis report in the server according to a second embodiment.

FIG. 13 is a flowchart of the process of generating a diagnosis report in the server 30 according to the second embodiment. The process shown in FIG. 13 is executed in the server 30 once every trip of the vehicle 10. The same processes as the processes shown in FIG. 11 will be denoted by the same reference signs and description thereof will be omitted. In the routine shown in FIG. 13, when the determination result of step S104 is in the affirmative, the process moves to step S301. In step S301, the control unit 31 extracts all predetermined behaviors with a score equal to or higher than the threshold value from the detection data 34. Then, in step S302, the control unit 31 extracts all the items corresponding to the extracted predetermined behaviors. Further, in step S303, the control unit 31 extracts all the messages corresponding to the extracted predetermined behaviors. In some cases, the same item corresponds to different predetermined behaviors. In such cases, it is possible that one item corresponds to a plurality of messages in the diagnosis report.

In this way, it is possible to recommend more suitable items to the user while restricting the number of items to be recommended.

Third Embodiment

In a third embodiment, a predetermined number of items is recommended to the user in order of score. The predetermined number can be arbitrarily determined. The predetermined number may be determined by the control unit 31 or may be determined by the user. The items may be determined such that, for behaviors with a score equal to or higher than a threshold value, the number of items to be recommended to the user becomes equal to or smaller than the predetermined number. In this case, the items to be recommended to the user may be determined in order of score or may be randomly determined. As in the second embodiment, the threshold value is a score at which it is considered advisable to install the item in the vehicle 10. This threshold value, too, may be determined by the control unit 31 or may be determined by the user.

A flowchart of the process of generating a diagnosis report in the server 30 according to the third embodiment will be described based on FIG. 13. In the third embodiment, in step S301, the control unit 31 extracts all predetermined behaviors with a scores equal to or higher than the threshold value from the detection data 34. Then, in step S302, the control unit 31 extracts a predetermined number of items corresponding to the extracted predetermined behaviors in descending order of score. Even when the same item is extracted multiple times, the number of that item is regarded as one.

In this way, it is also possible to recommend a plurality of items to the user. Also in this case, as the number of items recommended to the user is restricted to the predetermined number or less, the user is less likely to feel annoyed.

Fourth Embodiment

The method of calculating the score described in the above-described embodiment is one example, and another calculation method may be adopted. In that case, for example, the score should be calculated so as to be higher for a behavior that is more highly correlated with occurrence of an accident. The score may be indicated in five levels from 1 to 5, for example, as points out of five points.

When there is a plurality of predetermined behaviors with the highest score (i.e., when there is a plurality of predetermined behaviors with the same score), the control unit 31 may recommend to the user an item corresponding to the predetermined behavior with the largest number of times of occurrence of the predetermined behaviors with the highest score. A predetermined behavior with a large number of times of occurrence is considered to be a predetermined behavior with a high probability of occurrence in the vehicle 10 also in the future. That is, it is inferred that, as a tendency of the user's driving, the user drives in a manner in which such a predetermined behavior can occur. By recommending an item according to that predetermined behavior, an item suitable to the tendency of the user's driving can be recommended.

Figure 14:
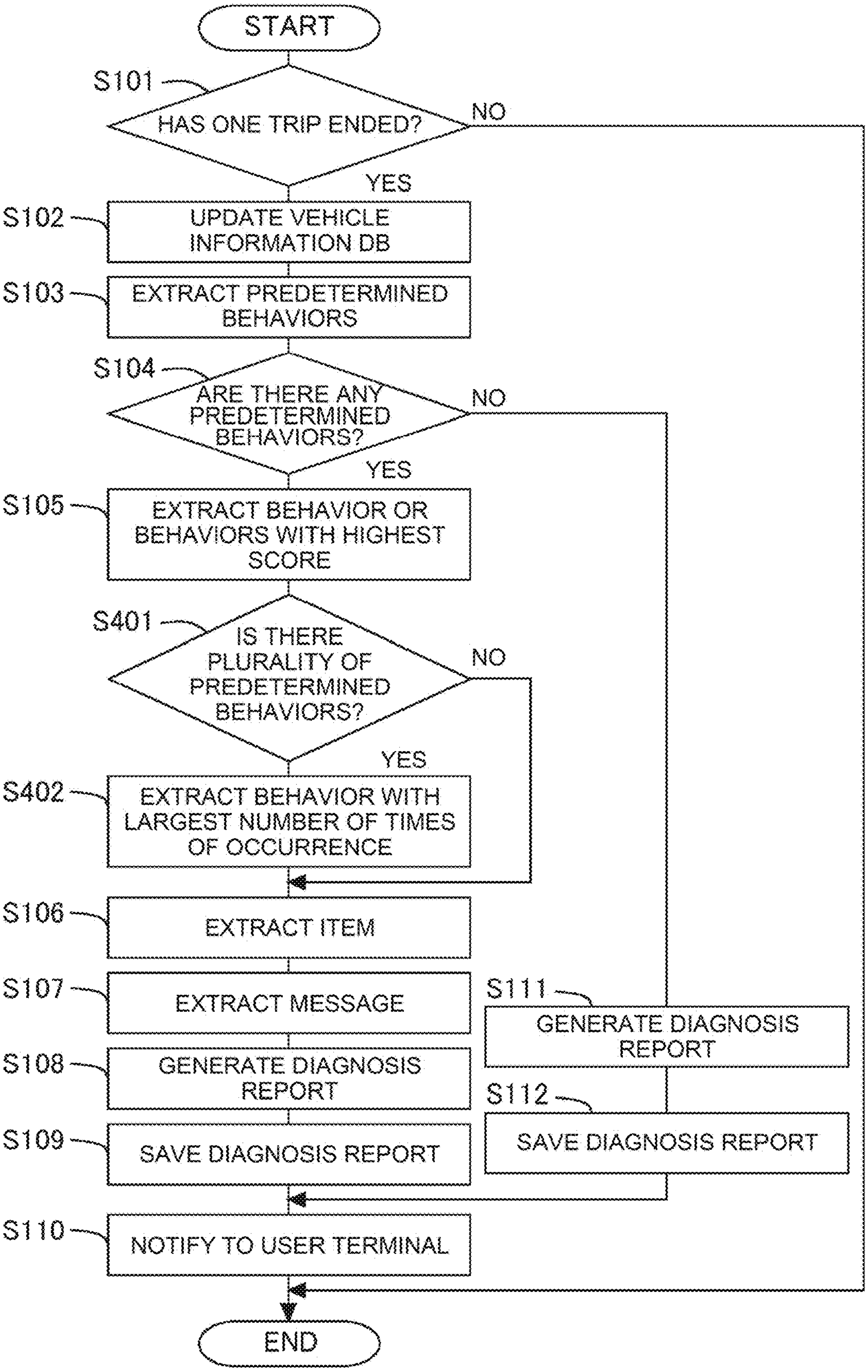
FIG. 14 is a flowchart of a process of generating a diagnosis report in the server according to a fourth embodiment.

FIG. 14 is a flowchart of the process of generating a diagnosis report in the server 30 according to the fourth embodiment. The process shown in FIG. 14 is executed in the server 30 once every trip of the vehicle 10. The same processes as the processes shown in FIG. 11 or FIG. 13 will be denoted by the same reference signs and description thereof will be omitted. In the routine shown in FIG. 14, when the process of step S105 is completed, the process moves to step S401. In step S401, the control unit 31 determines whether a plurality of predetermined behaviors has been extracted in step S105. That is, the control unit 31 determines whether there are predetermined behaviors with the same score that is the highest score. When the determination result of step S401 is in the affirmative, the process moves to step S402, and when the determination result is in the negative, the process moves to step S106. In step S402, the control unit 31 refers to the detection data 34 and extracts a predetermined behavior with the largest number of times of occurrence of the predetermined behaviors extracted in step S105. When the number of times of occurrence is also the same, for example, the control unit 31 may randomly select a predetermined behavior.

As another example, when there is a plurality of predetermined behaviors with the highest score, the control unit 31 may recommend to the user the item corresponding to the predetermined behavior that has occurred last of the predetermined behaviors with the highest score. A predetermined behavior of which the time of occurrence is the latest is highly likely to remain in the user's memory, and therefore an item that is satisfactory for the user can be recommended. Thus, the user is more likely to purchase that item.

Figure 15:
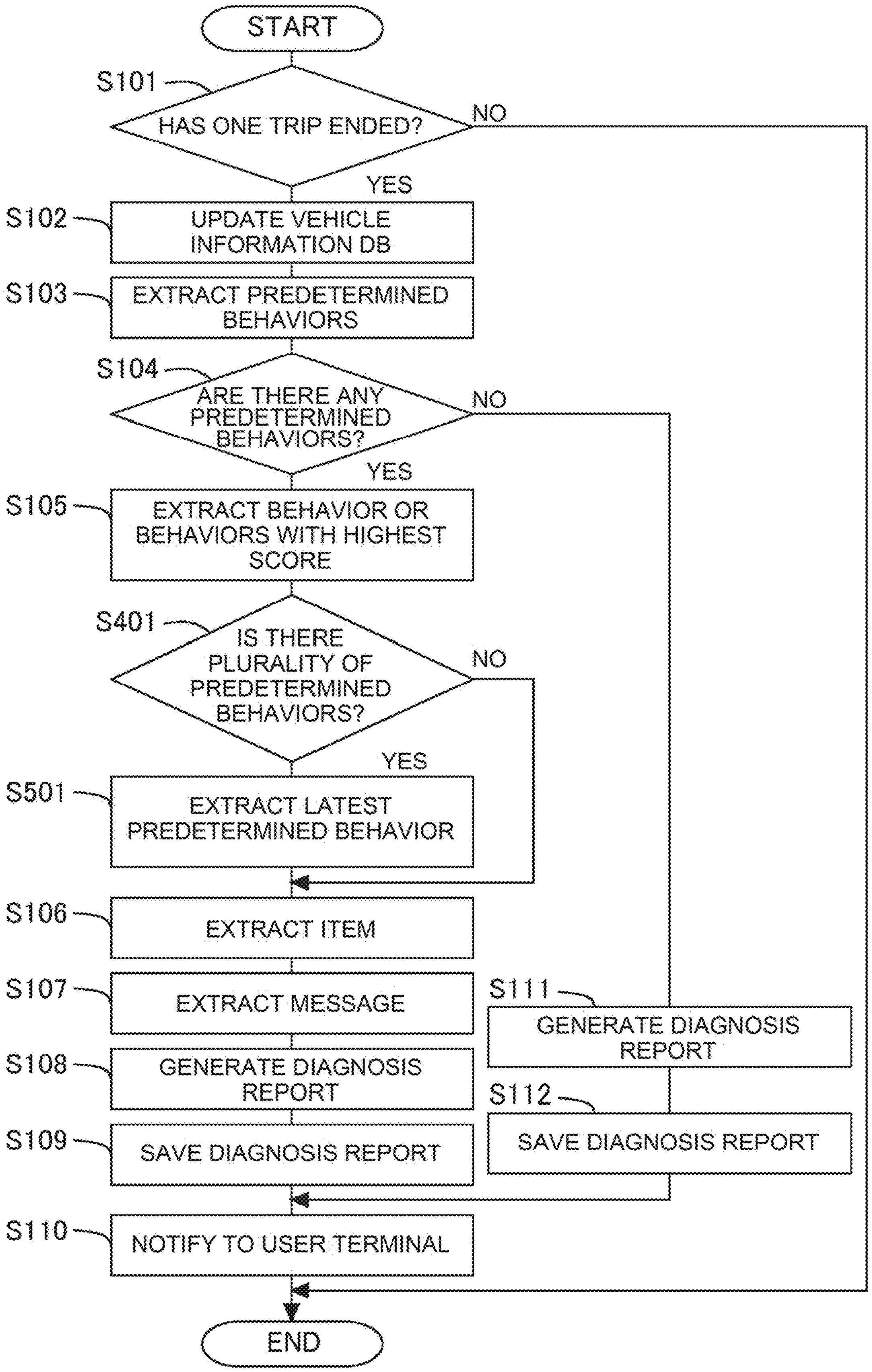
FIG. 15 is a flowchart of a process of generating a diagnosis report in the server according to another example of the fourth embodiment.

FIG. 15 is a flowchart of the process of generating a diagnosis report in the server 30 according to another example of the fourth embodiment. The process shown in FIG. 15 is executed in the server 30 once every trip of the vehicle 10. The same processes as the processes shown in FIG. 14 will be denoted by the same reference signs and description thereof will be omitted. In the routine shown in FIG. 15, when the determination result of step S401 is in the affirmative, the process moves to step S501. In step S501, the control unit 31 refers to the detection data 34 and extracts a predetermined behavior of which the time of occurrence is the latest, i.e., which has occurred last, of the predetermined behaviors extracted in step S105.

In this way, a more suitable item can be recommended to the user.

Other Embodiments

The above-described embodiments are merely examples, and this disclosure can be implemented with changes made thereto as appropriate within such a range that no departure is made from the gist of the disclosure. The processes and means having been described in this disclosure can be implemented in arbitrary combinations to such an extent that no technical inconsistency arises. Processes that have been described as being performed by one device may be divided among and executed by a plurality of devices. Or processes that have been described as being performed by different devices may be executed by one device. In the computer system, by what hardware configuration (server configuration) each function is realized can be flexibly changed. For example, some or all of the functions of the server 30 may be possessed by the vehicle 10 or the user terminal 20.

This disclosure can also be realized by supplying a computer program provided with the functions described in the above-described embodiments to a computer, and making one or more processors belonging to that computer read and execute the program. Such a computer program may be provided to the computer by a non-transitory computer-readable storage medium that can be connected to a system bus of the computer, or may be provided to the computer via a network. Examples of non-transitory computer-readable storage media include arbitrary types of discs such as magnetic discs (Floppy® discs, hard disc drives (HDDs), etc.) and optical discs (CD-ROMs, DVD discs, Blu-ray discs, etc.), read-only memories (ROMs), random-access memories (RAMs), EPROMs, EEPROMs, magnetic cards, flash memories, optical cards, and arbitrary types of media suitable for storing electronic commands.

What is claimed is:

1. An information processing device comprising a processor, wherein the processor is configured to execute:

acquiring information related to driving of a driver of a vehicle during a predetermined period;

extracting one or more predetermined actions according to the acquired information related to the driving;

determining one or more first items to be provided to the driver according to degrees of deviation from standard states of the one or more predetermined actions corresponding to the respective extracted one or more predetermined actions; and transmitting information related to the one or more first items to a terminal of the driver, wherein the one or more first items include a vehicle equipment item or an accessory installed in the vehicle, and after the predetermined period ends, the processor extracts the one or more predetermined actions, determines the one or more first items, generates a diagnosis report including information related to the one or more first items, and transmits the diagnosis report to the terminal of the driver.

2. An information processing device comprising a processor, wherein the processor is configured to execute:

acquiring information related to driving of a user of a vehicle during a predetermined period;

extracting one or more predetermined behaviors according to the acquired information related to the driving;

determining one or more first items to be recommended to the user according to degrees of deviation from standard states of the one or more predetermined behaviors corresponding to the respective extracted one or more predetermined behaviors; and transmitting information related to the one or more first items to a terminal of the user, wherein the one or more first items include a vehicle equipment item or an accessory installed in the vehicle, and after the predetermined period ends, the processor extracts the one or more predetermined behaviors, determines the one or more first items, generates a diagnosis report including information related to the one or more first items, and transmits the diagnosis report to the terminal of the user.

3. The information processing device according to claim 2, wherein the processor is configured to further execute:

acquiring one or more physical amounts relating to the driving of the user during the predetermined period as the information related to the driving of the user during the predetermined period; and acquiring degrees of deviation from threshold values of the one or more physical amounts as the degrees of deviation from the standard states of the one or more predetermined behaviors.

4. The information processing device according to claim 3, wherein the processor is configured to further execute:

determining one or more first behaviors to be notified to the user among the one or more predetermined behaviors according to the degrees of deviation from the threshold values of the one or more physical amounts corresponding to the respective extracted one or more predetermined behaviors;

determining the one or more first items according to the one or more first behaviors; and transmitting the information related to the one or more first items along with messages corresponding to the one or more first behaviors to the terminal of the user.

5. The information processing device according to claim 2, wherein the processor is configured to determine, as the first item, an item corresponding to a predetermined behavior with a highest degree of deviation.

6. The information processing device according to claim 2, wherein the processor is configured to determine, as the first item, an item corresponding to a predetermined behavior with a largest number of times of occurrence.

7. The information processing device according to claim 2, wherein the processor is configured to determine, as the first item, an item corresponding to a predetermined behavior that has occurred last in the predetermined period.

8. The information processing device according to claim 2, wherein the processor is configured to determine the one or more first items such that the number of the one or more first items is equal to or smaller than a predetermined number.

9. The information processing device according to claim 2, further comprising a memory configured to store information related to items corresponding to the one or more predetermined behaviors.

10. An information processing method executed by a computer, comprising:

acquiring information related to driving of a user of a vehicle during a predetermined period;

extracting one or more predetermined behaviors according to the acquired information related to the driving;

determining one or more first items to be recommended to the user according to degrees of deviation from standard states of the one or more predetermined behaviors corresponding to the respective extracted one or more predetermined behaviors; and transmitting information related to the one or more first items to a terminal of the user, wherein the one or more first items include a vehicle equipment item or an accessory installed in the vehicle, and the method further includes, after the predetermined period ends, extracting the one or more predetermined behaviors, determining the one or more first items, generating a diagnosis report including information related to the one or more first items, and transmitting the diagnosis report to the terminal of the user.

11. The information processing method according to claim 10, further comprising:

acquiring one or more physical amounts relating to the driving of the user during the predetermined period as the information related to the driving of the user during the predetermined period; and acquiring degrees of deviation from threshold values of the one or more physical amounts as the degrees of deviation from the standard states of the one or more predetermined behaviors.

12. The information processing method according to claim 11, further comprising:

determining one or more first behaviors to be notified to the user among the one or more predetermined behaviors according to the degrees of deviation from the threshold values of the one or more physical amounts corresponding to the respective extracted one or more predetermined behaviors;

determining the one or more first items according to the one or more first behaviors; and transmitting the information related to the one or more first items along with messages corresponding to the one or more first behaviors to the terminal of the user.

13. The information processing method according to claim 10, further comprising determining, as the first item, an item corresponding to a predetermined behavior with a highest degree of deviation.

14. The information processing method according to claim 10, further comprising determining, as the first item, an item corresponding to a predetermined behavior with a largest number of times of occurrence.

15. The information processing method according to claim 10, further comprising determining, as the first item, an item corresponding to a predetermined behavior that has occurred last in the predetermined period.

16. The information processing method according to claim 10, further comprising determining the one or more first items such that the number of the one or more first items is equal to or smaller than a predetermined number.

17. The information processing method according to claim 10, further comprising storing information related to items corresponding to the one or more predetermined behaviors.

* * * * *